United States Patent
Clark

[15] 3,706,247
[45] Dec. 19, 1972

[54] INSERT DISPENSER
[72] Inventor: Frank Emmons Clark, Augusta, Ga.
[73] Assignee: The Babcock & Wilcox Company, New York, N.Y.
[22] Filed: Dec. 4, 1970
[21] Appl. No.: 95,184

[52] U.S. Cl. ............................83/24, 83/98, 83/209, 83/261, 83/279, 83/358, 83/365, 83/367
[51] Int. Cl. ..........................B26d 5/34, B65h 35/06
[58] Field of Search........83/203, 205, 209, 261, 279, 83/358, 367, 365, 24, 98; 53/389, 69, 74

[56] References Cited

UNITED STATES PATENTS

| | | | |
|---|---|---|---|
| 3,440,796 | 4/1969 | Harrison | 53/74 |
| 696,112 | 3/1902 | Stearns | 53/389 |
| 2,232,558 | 2/1941 | Petskeyes et al. | 83/358 X |
| 2,803,930 | 8/1957 | Schmidt | 53/74 |
| 3,484,098 | 12/1969 | Ramsey et al. | 83/358 X |
| 3,559,367 | 2/1971 | Misik | 53/74 |
| 3,580,119 | 5/1971 | Witherington-Perkins | 83/205 X |

Primary Examiner—Frank T. Yost
Attorney—J. Maguire

[57] ABSTRACT

A method of automatically supplying a cushioning sheet to a shaped refractory as an overlay insert prior to packaging so that the sheet functions as a cushion between such items to retard the abrasion of the surfaces thereof during handling and shipment. The web of cushioning material is cut in a predetermined length in response to the presence of an item at a predetermined location relative to a cutting station. Also, the web of cushioning material is fed to the cutting station in response to the free-fall travel of a severed sheet in an intersecting course with that of a shaped refractory moving along a conveyor at a predetermined velocity.

An apparatus for the aforesaid function wherein the feed and cutting are sequentially responsive to a plurality of sensing means, one of which is mounted intermediate a drag means and the shaped refractory to actuate feed and the other of which is mounted at a specified location relative to the cutting station adjacent the conveyor in order to actuate cutting.

3 Claims, 2 Drawing Figures

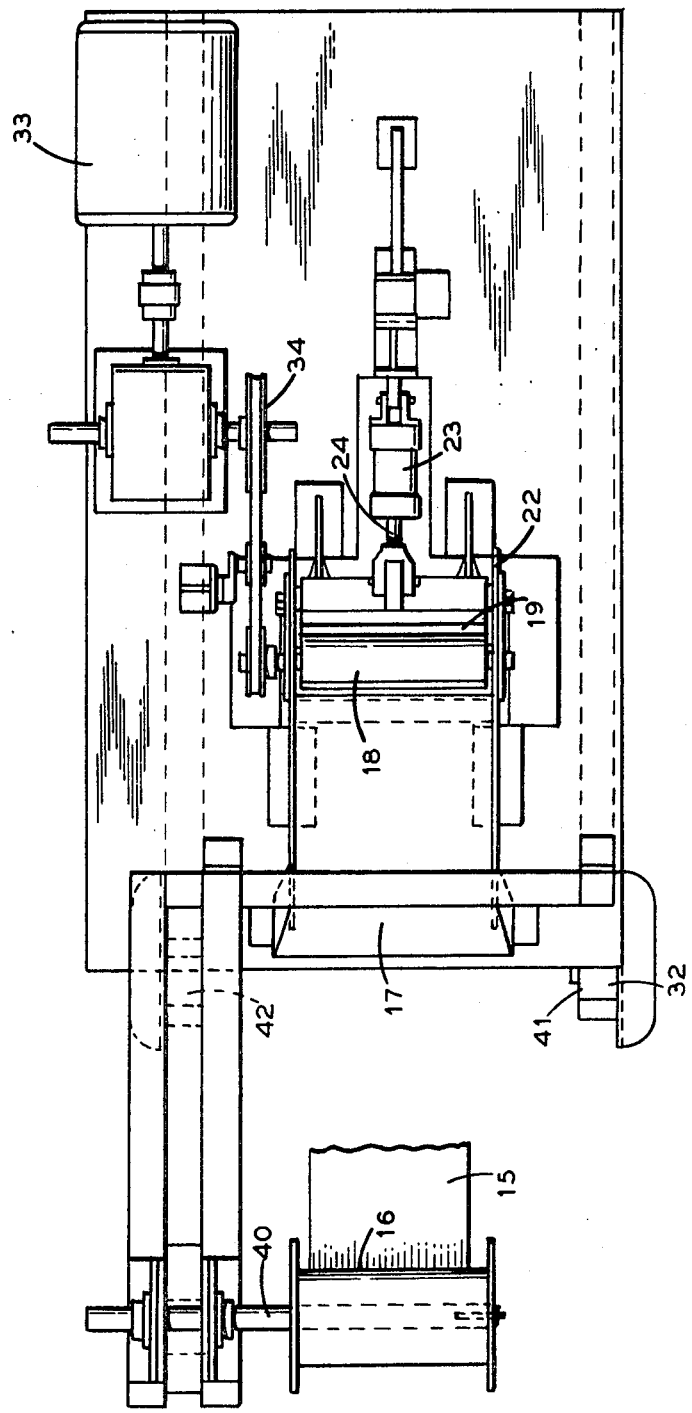

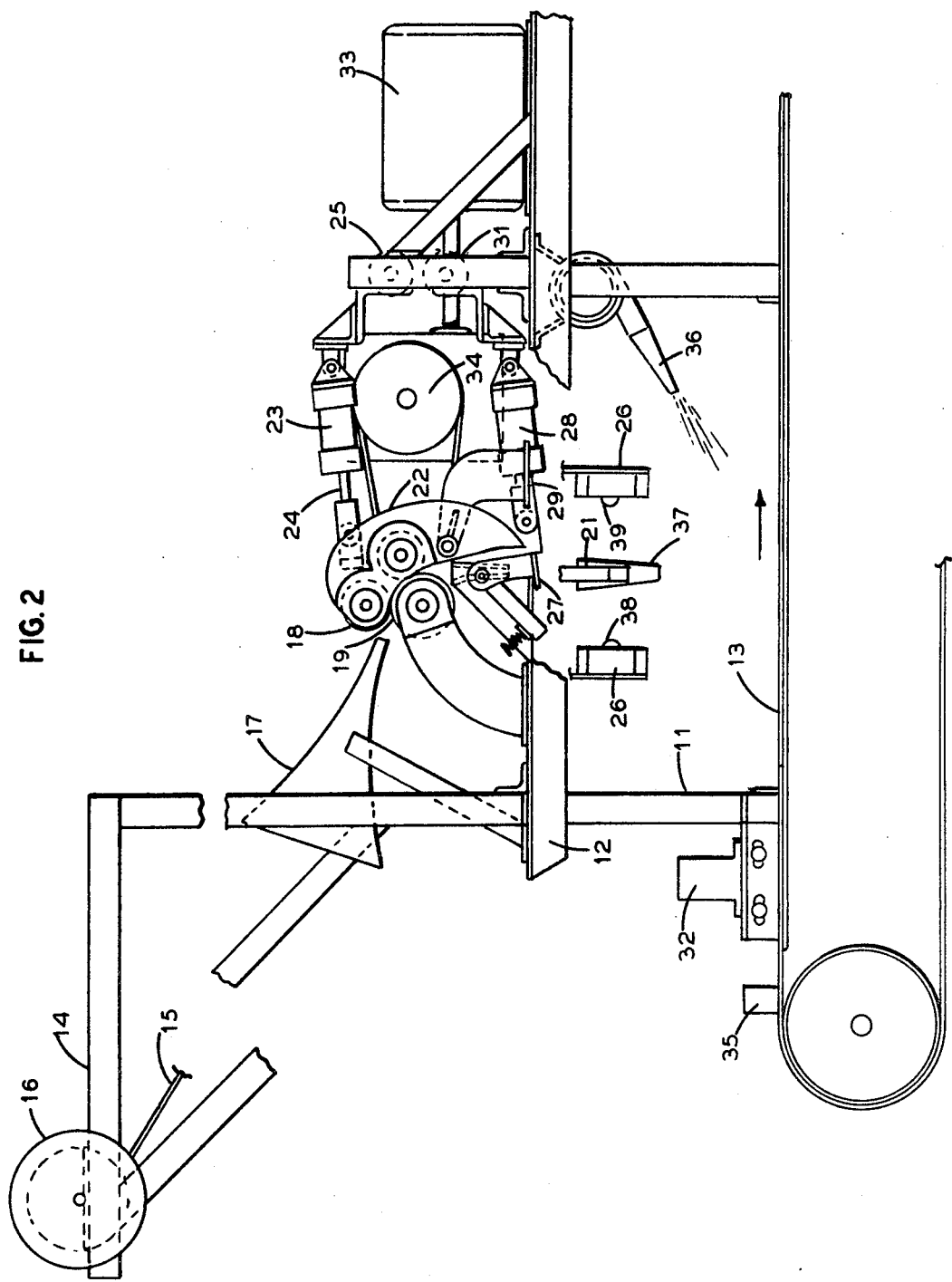

INSERT DISPENSER

This invention relates to an automatic dispensing of inserts of cushioning paper in an oriented fashion as overlays of high temperature insulating refractories such as firebrick.

More particularly, this invention relates to an apparatus for use in providing a fibrous sheet in an oriented attitude against each of an intermittent supply of items moving along a longitudinal path.

In the past, for some uses, it was highly preferred to utilize light-weight and highly porous refractories for insulation. However, the difficulty with such material lies in the ordinary handling and transporting of the finished product from one situs to another. The basis for this difficulty is the relatively fragile nature of the material including its relatively low abrasion resistance which renders the finished refractory product highly susceptible to damage.

The aforesaid difficulty has been substantially overcome by the insertion of a fibrous sheet having cushioning characteristics between any two finished refractory products such as bricks during the packaging of the same into containers. The cushioning material functions as a barrier between items in order to retard the degree of abrasion encountered therebetween during handling and transporting of the shipping container from situs to situs.

In the past, the above operation had been accomplished on a manual basis in order to insure the proper orientation of the cushioning sheet with respect to surfaces of the bricks which are highly susceptible to abrasion. However, this has been found to be quite costly and, on a contributory basis, represents a relatively sizeable portion of the shipping costs. For instance, it has been found that it costs approximately 20,000 dollars to man one chute for this purpose on a yearly basis involving one shift.

The subject invention overcomes the difficulties encountered in the manual operation of the art with special emphasis on a more economical, efficient and effective manner of installing inserts between such fragile refractory products for their protection prior to shipment.

It is therefore an object of this invention to provide an automated method for use in the provision of a fibrous sheet having cushioning characteristics in an oriented attitude against each of a plurality of items in response to the intermittent presence of each of such items in spaced relationship at a specific location on a longitudinal path moving at a predetermined velocity.

Another object is to provide an apparatus for such aforesaid provision of cushioning sheets in an effective manner for optimization of the efficiency of the packaging operation relative to fragile insulating refractories such as firebricks.

A further object of this invention is to provide an apparatus for the aforesaid use of improved construction having low fabrication and maintenance cost, high durability and facile in use under a wide variety of service conditions.

Other objects and many of the attendant advantages of this invention will be readily appreciated as the same become better understood by reference to the following detailed description when considered in connection with the accompanying drawing wherein:

FIG. 1 is a top plan view of the apparatus of this invention.

FIG. 2 is a side view of the apparatus of FIG. 1.

Similar numerals refer to similar parts throughout the several views.

Broadly, the method of this invention is to provide a fibrous sheet in an oriented attitude against each of an intermittent supply of items moving along a longitudinal chute such as a conveyor.

More specifically, the method encompasses the provision of a continuous fibrous web from a supply in an oriented manner to a drag station where it is moved on a positive and intermittent basis to a cutting station at which point it is cut into fibrous sheets of predetermined length. The step of feeding and cutting are sequentially responsive to a plurality of separate sensing stations each of which operates independently of the other. The movement of the web from the drag station to the cutting station is responsively dependent, in sequence, on the travel of a severed piece of fibrous sheet towards the item progressing at a predetermined velocity along the longitudinal path or conveyor. However, the cutting operation is responsively dependent, in sequence, to the presence of the item which is to be overlayed with the sheet at a predetermined location along the path relative to the cutting station.

As the severed sheet falls in an intersecting course towards the item, it is positively oriented against a surface of the item by the application of pressure of air.

In the preferred embodiment of this invention, as shown in FIG. 1 and 2, a plurality of supports 11 for a first level base 12 are mounted in fixed spaced relationships along a moveable longitudinal path 13 such as a conveyor. The first level base 12 supports the bulk of the equipment of this device while a second level base 14 supports a source of supply constituting the bulk of the fibrous web 15 in the form of a continuous roll 16. A chute 17 supported by the first level base 12 is spacially located intermediate the first and second base level 12, 14 and functions to provide orientation of the fibrous web 15 into a proper attitude for reception into a drag means which includes a moveable pair of parallel idler rollers 18 for separable intermittent engagement with a continuously driven roller 19. The drag means imparts intermittent movement to the fibrous web 15 through the first base level 12 overhead the longitudinally moving conveyor 13 thereby providing a sheet 21 of predetermined length in a alignment chute adjacent a cutting station. The parallel set of idler rollers 18 are rotatably mounted on a moveable carrier 22 which functions to advance and retract such idlers 18 into and out of engagement with the fixed drive rollers 19 by a spring-loaded, single action, air-cylinder 23 through a conventional linkage 24. The flow of air into the air cylinder 23 is controlled by a solenoid valve 25 which is actuated through conventional circuitry by a sensing unit 26 of the photoelectric send-and-receive variety, the latter being spacially positioned below the cutting station adjacent the path of the fibrous sheet 21 and overhead the moveable path 13. The cutting station consists of severing surface such as a moveable knife blade 27 which is pivotally mounted in fixed relationship relative to the path of the fibrous web 15 and is actuated by a spring-loaded, single action, air-cylinder 28 for a retractable thrust through a conventional linkage 29. The flow of air into the latter cylinder 28 is also controlled by a solenoid valve 31 which is actuated through conventional circuitry by a second sensing unit 32 of the photoelectric send-and-receive variety, the latter being spacially located adjacent the moving longitudinal path 13.

In operation, as shown in FIG. 1 and 2, a motive source (not shown) actuates a motor 33 by means of conventional circuitry to rotate driver rollers 19 through a speed reducer 34 on a continuous basis during the operation of packing insulating bricks 35 into cartons for shipment. A roll 16 of a continuous fibrous web 15 such as conventional cushion paper is rotatably mounted on a spindle 40 and is guided by hand into a chute 17 orienting such paper for reception into the feed section of the drive means defined by the continuously driven roller 19 and the two idler rollers 18. The drive means provide movement to the fibrous web 15, passed the cutting station, into an alignment chute 37 until the leading edge of the web 15 breaks the beam of light between the send and receive unit 38, 39 of the photoelectric sensor 26. When the light beam is broken, a solenoid valve 25 is actuated through the use of conventional circuitry, and air pressure is shut off in the air cylinder 23. In sequence, a retractive spring (not shown) in the air cylinder 23 moves the carriage 22 in an outward manner relative to drive rollers 19 and releases the pressure of the idler rollers 18 against the fibrous web 15 and revolving drive rollers 19. This, in effect, stops forward motion of the fibrous web and it is then in a stationary position for cutting into a severed sheet of predetermined length. The idler rollers 18 at this point will normally remain out of contact with the web 15 by the action of the retraction spring within the single-action air-cylinder 23 until the cutting cycle is normally completed.

The cutting cycle will begin, when an item 35 moving along the longitudinal path 13 interrupts a beam transversely traversing such path between a send and receive unit 41, 42 of a photoelectric sensor 32 positioned at a predetermined location relative to the cutting station. This interruption activates a solenoid valve 31 through conventional circuitry and air is forced into the cylinder 28 which provides a forward thrust to the severing edge 27 through a conventional linkage 29. This forward thrust is of sufficient power to sever the fibrous web 15 positioned in the chute 37 to form a sheet 21 of predetermined length. When the item 35 has completely passed the sensing station 32, the beam of light will return to the normal uninterrupted state and will be received by the sensing unit 32. This action will again actuate the solenoid valve 31 to cut off the air pressure and the retractive spring in the air cylinder 28 will return the knife 27 to its original rest position through a conventional linkage 29 after the cutting stroke. Note should be taken that the length of the severed sheet may be predetermined by a variation of the distance between the feed actuating means and the cutting station.

At this point, the severed fibrous sheet 21 of predetermined length will free-fall from the adjustable angle deflection chute 37 in a downward path which intersects that of the insulating brick 35 which is progressing at a predetermined velocity along the longitudinal path 13 after interrupting the beam of the photoelectric sensing unit 32. It is only necessary to coordinate the speed of free-fall of the sheet with actual velocity of the moving of the items along the conveyor for effective operation. To aid in the further positive orientation of the severed sheet 21 against the insulating brick 35, a force of compressed air from source 36 is directed towards the sheet at the point of intersection of the sheet 21 and the insulating brick 35.

When the fibrous web 15 has been cut and the severed sheet 21 falls from the orientation chute 37 towards the particular brick 35 passing on the conveyor 13, the light beam will become uninterrupted and the photoelectric sensing unit 26 will actuate the solenoid valve 25 again through conventional circuitry, and air will be forced into the cylinder 23 pushing the carriage 22 for the idler rollers 18 in forwardly direction. This will cause the latter rollers 18 to press the web of paper 15 tightly against the revolving rollers 19 on the drive means and will automatically feed the fibrous web 15 downward until a new leading edge of the web breaks the beam of the photoelectric cell 26 and a new portion of the web is in position for cutting.

As is evident from the foregoing, this invention provides a method and apparatus for the provision of a cushion sheet at an angle against the face of an item such as a refractory when the spacing of such items along a conveyor is in a random fashion on an intermittent basis in response to production.

What is claimed is:

1. A method of providing a fibrous sheet in an oriented attitude against each of an intermittent supply of items moving along a longitudinal path comprising:
    providing a supply of continuous fibrous web in an oriented manner to a drag station,
    moving said fibrous web on an intermittent but positive basis to a cutting station from said drag station, and
    cutting said fibrous web on an intermittent basis to form cut sheets of predetermined length,
    said movement of said web responsive in each case sequentially to a free fall of each of said severed sheets towards said item past a sensing station, and said cutting of said web responsive in each case sequentially to the presence of each of said items past a predetermined location along said longitudinal path relative to said cutting station, and
    positively orienting said sheet against a surface of each of said items.

2. The method of claim 1 wherein said fibrous web is cut in a positive manner to produce a severed sheet of predetermined length responsive to the passage of each of said items through a sensing station which is a predetermined distance from said cutting station to achieve an overlay of said sheet of said item.

3. The method of claim 2 wherein said fibrous web is in the form of cushion paper for each of said items which are in the form of fragile insulating bricks.

* * * * *